United States Patent
Lim et al.

(10) Patent No.: US 7,313,124 B2
(45) Date of Patent: Dec. 25, 2007

(54) ADAPTIVE DOWNLINK PACKET TRANSMISSION METHOD IN MULTICARRIER CDMA SYSTEM

(75) Inventors: Kwang-Jae Lim, Daejon (KR); Sooyoung Kim, Daejon (KR); Seong-Pal Lee, Daejon (KR)

(73) Assignee: Electronics and Telecommunications Research Institute (KR)

( * ) Notice: Subject to any disclaimer, the term of this patent is extended or adjusted under 35 U.S.C. 154(b) by 537 days.

(21) Appl. No.: 10/893,774

(22) Filed: Jul. 16, 2004

(65) Prior Publication Data

US 2005/0141473 A1 Jun. 30, 2005

(30) Foreign Application Priority Data

Dec. 27, 2003 (KR) .................... 10-2003-0098342

(51) Int. Cl.
*H04B 7/216* (2006.01)
*H04Q 7/20* (2006.01)

(52) U.S. Cl. .................... 370/342; 455/450; 370/441

(58) Field of Classification Search ................ 370/335, 370/332, 342; 455/452.2, 450
See application file for complete search history.

(56) References Cited

U.S. PATENT DOCUMENTS

| | | | |
|---|---|---|---|
| 6,018,528 A | 1/2000 | Gitlin et al. | |
| 6,031,827 A | 2/2000 | Rikkinen et al. | |
| 6,219,343 B1 | 4/2001 | Honkasalo et al. | |
| 6,278,701 B1 | 8/2001 | Ayyagari et al. | |
| 6,314,084 B1 | 11/2001 | Kahale et al. | |
| 6,317,435 B1 | 11/2001 | Tiedemann, Jr. et al. | |
| 2002/0119781 A1* | 8/2002 | Li et al. | 455/450 |
| 2004/0131025 A1* | 7/2004 | Dohler et al. | 370/328 |

OTHER PUBLICATIONS

CDMA/HDR: A Bandwidth-Efficient High-Speed Wireless Data Service for Nomadic Users, IEEE Communications Magazine, Jul. 2000, pp. 70-77.
Beyond 3G: Wideband Wireless Data Access BAsed on OFDM and Dynamic Packet Assignment; IEEE Communications Magazine, Jul. 2000, pp. 78-87.

(Continued)

*Primary Examiner*—Rafael Perez-Gutierrez
*Assistant Examiner*—Amancio Gonzalez
(74) *Attorney, Agent, or Firm*—Blakely, Sokoloff, Taylor & Zafman

(57) ABSTRACT

Disclosed is an adaptive downlink packet transmission method for a multicarrier Code Division Multiple Access (MC-CDMA) system. The method can allocate radio resources efficiently according to the variations of channel conditions for each user terminal, allocate transmission power appropriately according to the interference from the same cell, and minimize interference to adjacent cells. The adaptive downlink packet transmission method includes the steps of: a) estimating a signal-to-interference-and-noise ratio (SINR) in a user terminal after channel equalization and despreading by measuring a downlink pilot channel; b) measuring an average interference factor and an average noise power; and c) allocating radio resources adaptively in the central station by determining transmission slots in a transmission frame, the number of spreading codes to be used in each transmission slot, symbol energy for each spreading code, and a transmission method, until transmission slots and packets to be allocated are not available.

8 Claims, 4 Drawing Sheets

OTHER PUBLICATIONS

Providing Quality of Service over a Shared Wireless Link; IEEE Communications Magazine, Feb. 2001, pp. 150-154.

Radio Resource Allocation in Third-Generation Mobile Communications Sytems, IEEE Communications Magazine, Feb. 2001, pp. 117-123.

QoS-Oriented Access Control for 4G Mobile Multimedia CDMA Communications, IEEE Communications Magazine, Mar. 2002, pp. 118-125.

Hiearchical SIR and Rate Control on the Forward Link for CDMA Data Users Under Delay and Error Constraints, IEEE Journal on Selected Areas in Communications, vol. 19, No. 10, Oct. 2001, pp. 1871-1882.

* cited by examiner

ADAPTIVE DOWNLINK PACKET TRANSMISSION METHOD IN MULTICARRIER CDMA SYSTEM

FIELD OF THE INVENTION

The present invention relates to an adaptive downlink packet transmission method that can allocate downlink radio resources which are shared and used by users according to their channel conditions adaptively and efficiently to thereby increase system transmission efficiency, when packets are transmitted to user terminals through downlink in a multicarrier Code Division Multiple Access (CDMA) system, such as a mobile satellite communication system adopting multicarrier CDMA method.

DESCRIPTION OF RELATED ART

In the third generation mobile communication systems for providing diverse multimedia services including a packet service as well as a speech service, such as the Wideband-Code Division Multiple Access (W-CDMA) system suggested by the 3rd Generation Partnership Project (3GPP) and the CDMA 2000 suggested by the 3rd Generation Partnership Project 2 (3GPP2), a radio link is formed through a circuit-switched method or a packet-switched method.

In the packet-switched method, radio resources are shared by user on service and used only when actual packet transmission is performed for a user. Therefore, with the property of statistical multiplexing, the packet-switched method makes the resources of a system used efficiently, and eventually increases the transmission capacity of the system.

In the packet-switched method, it is important to allocate the radio resources appropriately for each packet transmission.

1xEvolved Data Only (1xEvDO) of the 3GPP2 is a representative system for packet-only service which adopts the packet-switched method to increase the spectral efficiency.

In the forward link, packets transmitted to users are multiplexed by each time slot in time division multiplexing. The packets in each time slot are always transmitted from a base station in a maximum available power. Each user measures a signal to interference ratio of a received signal with respect to pilot symbols which are added to the central part of each time slot, selects a transmission rate appropriate for the current condition based on a predetermined transmission rate table, and reports the selected transmission rate to the base station. The base station performs scheduling for packets to be transmitted based on the transmission rates selected by each user, and transmits packets at the selected transmission rate in a selected slot. The base station supports 12 different packet transmission rates according to the different symbol repetition number, modulation type and code rate. Since packets are transmitted at a maximum rate in the 1xEvDO of the 3GPP2, the 1xEvDO system has an advantage that it needs not perform power control in the forward link. However, it also has shortcomings that it can use power more than necessary for a user with already good channel conditions and, as a result, leads to more interference to users in adjacent cells.

Also, due to the use of Direct Sequence CDMA (DS-CDMA), the 1xEvDO system presents lower performance in frequency selective fading than a system of MC-CDMA. In case of a terrestrial mobile communication system where the distance between a base station and a user terminal is short, it is possible to perform adaptive transmission according to the variations of channel conditions by multipath fading, based on the measurement report from the user. However, in case of a mobile communication system using a satellite, the allocation of radio resources cannot be performed adaptively to the fast channel variation due to the long distance between the satellite and the user terminal. In case where the multicarrier method is used in the terrestrial system, appropriate subcarriers which are on good conditions can be selected based on the frequency response reported by users. However, in case of a satellite system, it is impossible to perform adaptive transmission with respect to the frequency selective fading due to long round trip delay.

In general, an adaptive transmission system including the 1xEvDO of the 3GPP2, the channel conditions of the user terminal is estimated by measuring only the receiving signal-to-interference ratio of a pilot channel. However, even in the same channel environments, the data packet receiving performance can be different according to the modulation and coding scheme used for the data packet transmission. Also, the channel conditions on the pilot channel are different from the channel conditions at the moment when the data packet is actually transmitted not through a pilot channel but through a data channel. In addition, the orthogonality between spreading codes is lost when packets are transmitted using a plurality of orthogonal spreading codes in a multipath fading channel. For more appropriate adaptation transmission, the interference caused by the loss of orthogonality should be considered.

SUMMARY OF THE INVENTION

It is, therefore, an object of the present invention to provide an adaptive downlink packet transmission method for a multicarrier Code Division Multiple Access (MC-CDMA) system. The method can allocate radio resources efficiently according to the variations of channel conditions for each user terminal, allocate transmission power appropriately according to the interference from the same cell, and minimize interference to adjacent cells.

In accordance with an aspect of the present invention, there is provided an adaptive downlink packet transmission method which includes the steps of: a) estimating signal-to-interference-and-noise ratio (SINR) in a user terminal after channel equalization and despreading by measuring a downlink pilot channel; b) measuring an average interference factor between spreading codes transmitted simultaneously and an average noise power which includes interference power of adjacent cells and background noise power, and reports those average values to a central station through an uplink; and c) allocating radio resources adaptively in the central station by determining transmission slots in a transmission frame, the number of spreading codes to be used in each transmission slot, symbol energy for each spreading code, and a transmission method which is a combination of various modulation and coding methods based on the average value of the interference factor between spreading codes transmitted simultaneously and the average value of noise power, until transmission slot to be allocated is not available.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Other objects and aspects of the invention will become apparent from the following description of the embodiments with reference to the accompanying drawings, which is set forth hereinafter.

Figure 1:
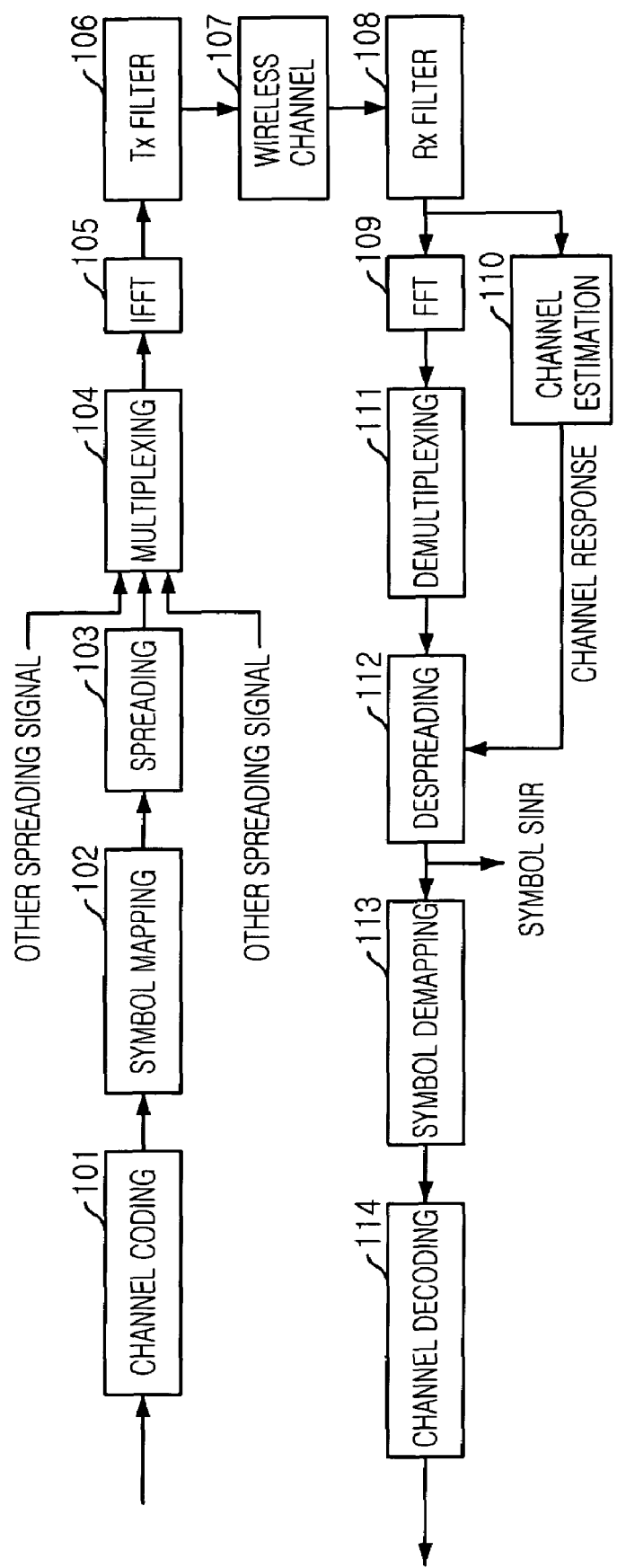
FIG. 1 is a block diagram showing a multicarrier Code Division Multiple Access (CDMA) system to which the technology of the present invention is applied.

FIG. 1 is a block diagram showing a multicarrier Code Division Multiple Access (MC-CDMA) system to which the technology of the present invention is applied.

Although the technology of the present invention can be best applied to a satellite mobile communication system environment, it can be applied to a terrestrial mobile communication system in which each cell is covered and serviced by a base station.

FIG. 1 shows a mobile communication system that uses the MC-CDMA as a technology for transmitting radio resources in a mobile communication system. The drawing shows baseband transmission and reception processes in a downlink (from a central station to a user terminal).

In the present invention, the central station performs a role of transmitting service packets to each user terminal through the downlink and, in the satellite communication system, a satellite or an earth station can be the central station. In case of a terrestrial communication system, a base station can be the central station. In the following description, the term 'central station' will be used to describe the adaptive packet transmission utilizing MC-CDMA method without a distinction of whether a system is a satellite communication system or a terrestrial communication system.

When the multicarrier method such as Orthogonal Frequency Division Multiplexing (OFDM) is used for mobile communication, the satellite communication system has a satellite link round trip delay longer than the time for channel fading variation. Because of that, the satellite communication system can hardly perform adaptive transmission in which different transmission rates are assigned to each subcarrier according to the channel conditions of each subcarrier. Therefore, if multicarrier transmission is used in the satellite link, the transmission should be adaptive to average variation in the entire band rather than to channel variation of each subcarrier, and should be adaptive to a fading variation which shows an even and slow variations across the entire band, such as shadow fading or rain fading, rather than fast fading variation caused by small-scale multipath fading.

In FIG. 1, data to be transmitted to the user terminal are converted into spread chip sequences through the processes of channel encoding 101, symbol mapping 102, and spreading 103. The chip sequences are multiplexed 104 along with signals from another user and go through multicarrier modulation 105 including Inverse Fast Fourier Transform (IFFT), such as OFDM modulation, and then transmitted out through a transmission filter 106.

Signals received in the user terminal through a radio channel 107 are restored into data through the reverse processes 108 to 114.

The signals received through the radio channel 107 are distorted by multipath fading in the mobile communication environment. A receiver of the user terminal performs channel equalization before despreading process 112 in order to restore the distorted signals.

During the channel estimation process 110, a current channel response is estimated from the received signals and the estimated channel response is used for the channel equalization of the despreading process 112.

Generally, downlink signals include pilot signals for helping time and frequency synchronization, channel estimation, and channel demodulation in a user terminal.

Just as the pilot symbol in a radio Local Area Network (LAN) adopting the OFDM method, the MC-CDMA method considered in the present invention can form pilot signals by transmitting pilot symbols in predetermined symbol time and subcarriers. The pilot signals can be used for the user terminal to measure channel conditions for adaptive transmission.

In a general multicarrier CDMA link, the user terminal includes a process of channel estimation and a process of channel equalization. In the channel estimation process, a channel response corresponding to each symbol time is estimated using the received pilot signals in order to obtain data from the received signals. In the channel equalizing process, an equalization coefficient is calculated from the estimated channel response according to a channel equalization method and applied to a receiving symbol.

Figure 2:
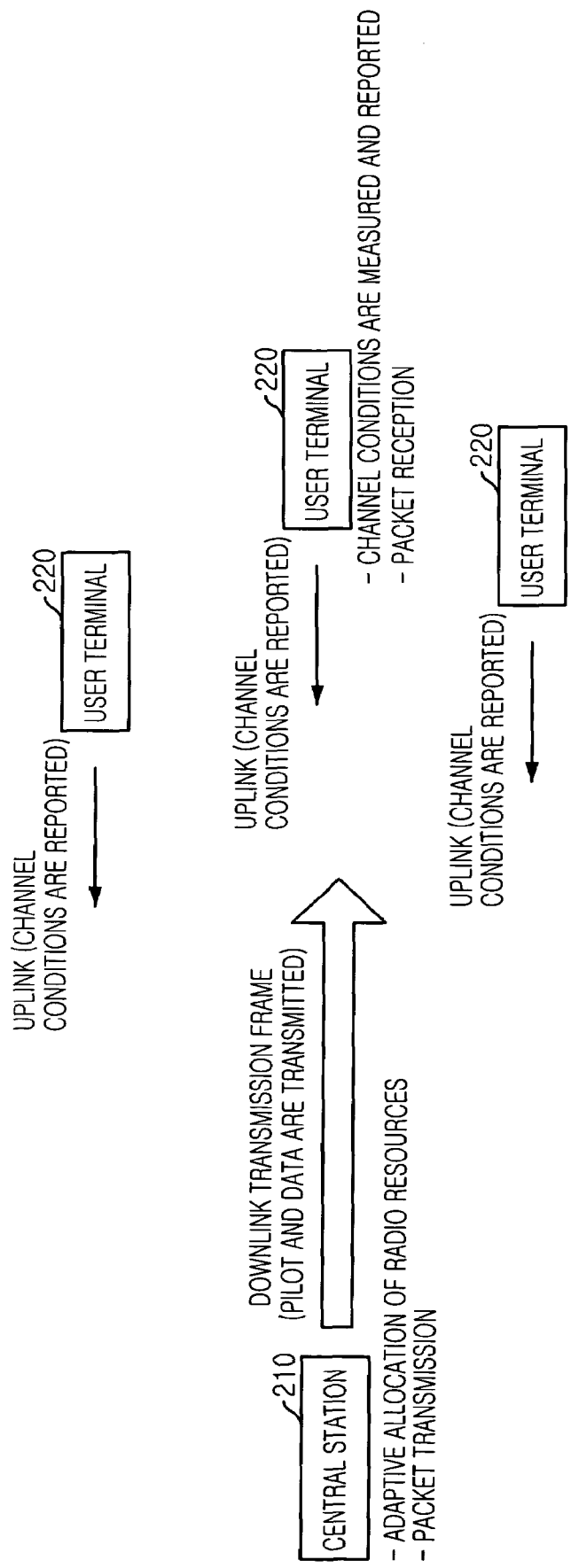
FIG. 2 is a diagram illustrating an adaptive downlink packet transmission method in accordance with an embodiment of the present invention.

FIG. 2 is a diagram illustrating an adaptive downlink packet transmission method in accordance with an embodiment of the present invention.

Each user terminal 220 measures the signal-to-interference-and-noise ratio (SINR) of the received symbol on the downlink, and reports the channel conditions to the central station 210 through the uplink.

The central station 210 performs adaptive radio resource allocation to transmit packets to each user terminal 220, based on SINR-related parameters reported from each user terminal 220.

Also, the central station 210 allocates transmission slots, transmission method (i.e., the modulation and coding methods, transmission power (i.e., symbol energy), and transmits packets to each user terminal 220.

Figure 3:
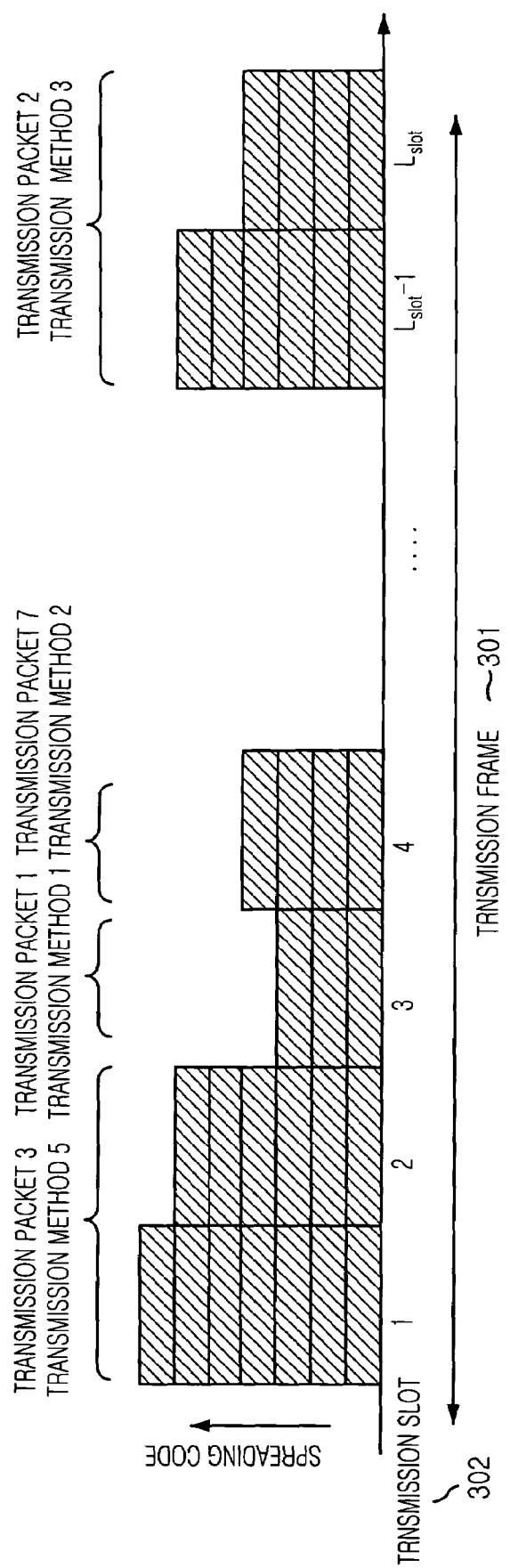
FIG. 3 is a diagram describing a transmission frame during the adaptive downlink packet transmission in accordance with an embodiment of the present invention.

FIG. 3 is a diagram describing a transmission frame during the adaptive downlink packet transmission in accordance with an embodiment of the present invention. The transmission frame is a downlink frame transmitted from the central station, and packets are allocated by the radio resource allocation process of the central station.

The downlink signals are transmitted on the basis of transmission frames 301, each having a predetermined length.

A transmission frame 301 can be divided into a plurality of transmission slots 302 for effective use of the radio resources.

The transmission frame 301 is divided based on time division by a plurality of transmission symbols in the time domain and on frequency division by subcarrier groups in the frequency domain. The transmission slots 302 are time slots which correspond to a particular symbol group in a frame and time/frequency slots formed of a group of subcarriers.

In FIG. 3, the transmission frame 301 is divided into $L_{slot}$ transmission slots 302 and each slot transmits a user packet by using a plurality of spreading codes.

For example, the first and second slots are used for a user packet 3. In the first slot, seven spreading codes are allocated and six spreading codes are allocated to the second slot. Transmission method 5 is used to transmit the user packet 3. The central station determines a transmission slot 302 to be used for the transmission of each packet, spreading codes to be used for each transmission slot 302, and a transmission method and transmission power to be used, forms a transmission frame 301, and transmits the transmission frame 301 to the user terminals through the downlink.

Before the description of the adaptive transmission, when a signal is transmitted from the central station to a user terminal, the symbol signal-to-interference-and-noise ratio (SINR) obtained after the channel equalization and despreading in the receiving process of FIG. 1 will be expressed, herein. This is used for adaptive transmission of the present invention.

An SINR $\gamma_{u,k,i}$ with respect to a $k^{th}$ receiving symbol using an $i^{th}$ spreading code in a user terminal u can be expressed as Equation 1.

$$\gamma_{u,k,i} = \frac{S_{u,k,i}}{I_{u,k,i} + N_{u,k,i}} \qquad \text{Eq. 1}$$

wherein $S_{u,k,i}$ denotes a receiving symbol power; $I_{u,k,i}$ denotes an interference symbol power; and $N_{u,k,i}$ denotes a background noise power.

The $S_{u,k,i}$, $I_{u,k,i}$ and $N_{u,k,i}$ can be expressed as Equations 2 through 4.

$$S_{u,k,i} = E_{k,j}\left(\sum_{n=1}^{N} H_{u,k,n} W_{u,k,n}\right)^2 \qquad \text{Eq. 2}$$

$$I_{u,k,i} = \sum_{\substack{j=1 \\ j \neq i}}^{} E_{k,j}\left(\sum_{n=1}^{N} C_{j,n} C_{i,n} H_{u,k,n} W_{u,k,n}\right)^2 \qquad \text{Eq. 3}$$

$$N_{u,k,i} = N_0 \sum_{n=1}^{N} |W_{u,k,n}|^2 \qquad \text{Eq. 4}$$

In Equation 4, N denotes a total number of spreading codes. In case where an orthogonal code such as a Walsh-Hadamard code is used, the number of codes is equal to the chip length of a spreading code and spreading factor.

In Equation 2, $E_{k,i}$ denotes a symbol energy in the $k^{th}$ transmitting symbol using the $i^{th}$ spreading code; $H_{u,k,i}$ denotes is a channel response corresponding to an $n^{th}$ chip in the $k^{th}$ receiving symbol, which is estimated during the channel estimation process of the user terminal u; and $W_{u,k,i}$ denotes an equalization coefficient to be used for the received sample corresponding to the $n^{th}$ chip for the $k^{th}$ receiving symbol in the user terminal u.

In Equation 3, $C_{i,n}$ denotes a chip value corresponding to the $n^{th}$ chip in the $i^{th}$ spreading code.

In Equation 4, $N_0$ denotes a noise power density and it includes the background noise power and an inter-cell interference power from adjacent cells.

During the despreading process in the receiver, the equalization coefficients can be calculated in diverse channel equalizing methods as shown in Equations 5 through 8 below.

Maximum Ratio Combining (MRC)

$$W_{u,k,n} = H_{u,k,n}^* \qquad \text{Eq. 5}$$

Orthogonality Restoring Combining (ORC)

$$W_{u,k,n} = \frac{H_{u,k,n}^*}{|H_{u,k,n}|^2} \qquad \text{Eq. 6}$$

Equal Grain Combining (EGC)

$$W_{u,k,n} = \frac{H_{u,k,n}^*}{|H_{u,k,n}|} \qquad \text{Eq. 7}$$

Minimum Mean Square Error Combining (MMSEC)

$$W_{u,k,n} = \frac{H_{u,k,n}^*}{|H_{u,k,n}|^2 + N_0/E_{k,i}} \qquad \text{Eq. 8}$$

The user terminal calculates an appropriate equalizing coefficient $W_{u,k,n}$ that corresponds to a subcarrier or a chip sample n in the $k^{th}$ symbol based on the channel response $H_{u,k,n}$ that corresponds to a subcarrier or a chip sample and is estimated in the channel estimation process, and multiplies the equalization coefficient $W_{u,k,n}$ to the corresponding receiving chip sample.

The symbol SINR with respect to the $i^{th}$ spreading code, which is shown in Equation 1, can also be expressed as Equation 9.

$$\gamma_{u,k,i} = \frac{E_{k,j}}{\sum_{\substack{i=1 \\ j \neq i}}^{N} E_{k,j} \alpha_{u,k,i,j} + \beta_{u,k} N_0} \qquad \text{Eq. 9}$$

wherein $\alpha_{u,k,i,j}$ denotes an interference factor; and $\beta_{u,k}$ denotes a noise factor.

The interference factor $\alpha_{u,k,i,j}$ and the noise factor $\beta_{u,k}$ are defined as Equations 10 and 11.

$$\alpha_{u,k,i,j} = \frac{\left(\sum_{n=1}^{N} C_{j,n} C_{i,n} H_{u,k,n} W_{u,k,n}\right)^2}{\left(\sum_{n=1}^{N} H_{u,k,n} W_{u,k,n}\right)^2} \qquad \text{Eq. 10}$$

$$\beta_{u,k} = \frac{\sum_{n=1}^{N} |W_{u,k,n}|^2}{\left(\sum_{n=1}^{N} H_{u,k,n} W_{u,k,n}\right)^2} \qquad \text{Eq. 11}$$

The interference factor $\alpha_{u,k,i,j}$ is defined by an interference ratio of a symbol transmitted by using a spreading code j to a symbol transmitted by using a spreading code i in the $k^{th}$ receiving symbol received in the user terminal u. The orthogonality between spreading codes disappears in a multipath fading channel, and the interference factor is a value that reflects the interference between spreading codes.

The noise factor $\beta_{u,k}$ is an amplification rate of the background noise power in the channel equalizing process. The average value $\alpha_{u,k,i}$ of interference factors for all the spreading codes used is defined as Equation 12.

$$\alpha_{u,k,i} = \sum_{j=1}^{N} E_{k,j}, \alpha_{u,k,i,j} / \sum_{j=1}^{N} E_{k,j} \qquad \text{Eq. 12}$$

When the average value $\alpha_{u,k,i}$ of the interference factors is defined as Equation 12, the SINR of a receiving symbol after the channel equalization and despreading can be expressed as Equation 13.

$$\gamma_{u,k,i} = \frac{E_{k,i}}{\alpha_{u,k,i} \sum_{\substack{j=1 \\ j \neq i}}^{N} E_{k,j} + \beta_{u,k} N_0} \qquad \text{Eq. 13}$$

In the SINR of Equation 13, the average value $\alpha_{u,k,i}$ of the interference factors and the average value $\beta_{u,k} N_0$ of the noise factors are measured in the user terminal and reported periodically to the central station for downlink adaptive transmission.

If the average values of the interference factors and the noise factors are measured with respect to the entire receiving symbols in a transmission frame, the average value $\alpha_u$ and the average value $\beta_u$ during the frame can be calculated as Equations 14 and 15.

$$\alpha_u = \frac{1}{KN} \sum_{k=1}^{K} \sum_{i=1}^{N} \alpha_{u,k,i} \qquad \text{Eq. 14}$$

$$\beta_u = \frac{1}{K} \sum_{k=1}^{K} \beta_{u,k} \qquad \text{Eq. 15}$$

When the value $\alpha_u$ and the value $\beta_u$ during the frame are used, the average received symbol SINR in the user terminal can be expressed as Equation 16.

$$\gamma_{u,k} = \frac{E_{k,i}}{\alpha_u \sum_{\substack{j=1 \\ j \neq i}}^{N} E_{k,j} + \beta_u N_0} \qquad \text{Eq. 16}$$

In Equation 16, the average value $\alpha_u$ of the interference factors during the frame is used for estimating interference between the symbols transmitted simultaneously at the same time by using different spreading codes, and the average value $\beta_u$ of the noise factors during the frame is used for estimating the noise power amplified during the channel equalization process of the user terminal.

The central station can estimate the receiving SINR of the user based on the two reported variables in Equation 16 and the transmission energy of the used spreading codes.

Meanwhile, in order to explain the adaptive radio resource allocation process in the central station, it is assumed that a transmission frame is divided into $L_{slot}$ transmission slots and $M_{MCS}$ transmission methods can be used.

Also, a transmission method is a combination of a modulation method of M-ary Phase Shift Keying (PSK) or M-ary Quadrature Amplitude Modulation (QAM) and a channel coding method.

With respect to a transmission method m, the number of bits that can be transmitted by using one spreading code in one transmission slot is different according to the transmission method and it is expressed as $X_{slot}(m)$ bits.

As the transmission method number m is increased, the transmission rate is raised. Thus, it is assumed that when m=1, the transmission rate is the smallest and when m=$M_{MCS}$ the transmission rate is the largest.

With respect to the transmission method m, the minimum symbol SINR that is required to satisfy a specific quality of the received signal such as the Bit Error Rate (BER) is obtained from a pre-determined table based on Equation 17.

$$\gamma_m^* = F_{required}(m, P_{BER}^*) \qquad \text{Eq. 17}$$

wherein $P_{BER}^*$ denotes a BER required for a specific quality of the received signal.

When data are transmitted to the user terminal u by using $N_{code}$ spreading codes simultaneously in a transmission slot and the maximum transmission energy that can be used for a transmission symbol is $E_{MAX}$ and the transmission energy is distributed uniformly to each spreading code symbol, the symbol SINR $\gamma_u$ for each spreading code can be expressed as Equation 18.

$$\gamma_u = \frac{E_{max}/N_{code}}{\alpha_u E_{max}(N_{code}-1)/N_{code} + \beta_u N_0} \qquad \text{Eq. 18}$$

wherein $\alpha_u$ and $\beta_u$ represents the average interference factor and noise factor, respectively, regardless of spreading codes used and symbol time.

The received symbol SINR should satisfy the minimum symbol SINR value which is required to a particular reception quality ($\gamma_u > \gamma_m^*$). For this, the number of spreading codes that can be transmitted simultaneously can be obtained as Equation 19.

$$N_{code} \leq \left(\frac{1+\alpha_u \gamma_m^*}{\gamma_m^*}\right)\left(\frac{E_{max}}{\alpha_u E_{max} + \beta_u N_0}\right) \qquad \text{Eq. 19}$$

Since the number of used spreading codes should be an integer, the maximum number of spreading codes that can be transmitted simultaneously is as shown in Equation 20 below.

$$N_{code} = F_{sup}(E_{max}, \gamma_m^*) = \left\lfloor \left(\frac{1+\alpha_u \gamma_m^*}{\gamma_m^*}\right)\left(\frac{E_{max}}{\alpha_u E_{max} + \beta_u N_0}\right) \right\rfloor \qquad \text{Eq. 20}$$

When the symbol energy for each spreading code is $E_{code}$, the symbol SINR can be expressed as Equation 21.

$$\gamma_u = \frac{E_{code}}{\alpha_u E_{code}(N_{code}-1) + \beta_u N_0} \qquad \text{Eq. 21}$$

Similarly, the minimum symbol energy for satisfying a condition $\gamma_u \geq \gamma_m^*$ can be obtained based on Equation 22.

$$E_{code} = F_{energy}(N_{code}, \gamma_m^*) = \frac{\beta_u N_0}{1/\gamma_m^* - \alpha_u(N_{code} - 1)} \qquad \text{Eq. 22}$$

To perform the adaptive transmission of the present invention, the user terminal estimates the channel conditions by using the channel response and the equalization coefficients that are estimated from the received pilot signal, and reports the estimated channel conditions to the central station.

The values used to report the channel conditions are the average values of the interference factor and the amplified noise power. From the two values, the central station estimates the SINR of the received signal at the user terminal. The two values are computed by the user terminal based on Equations 14 and 15.

In the calculation of the average value of interference factors, it is assumed that all the spreading codes are simultaneously transmitted and that the symbol energy for each spreading code is the energy of a pilot symbol. This is because the object of actual adaptive transmission is not a pilot symbol but a data symbol constituting a packet, and a pilot symbol uses only one particular spreading code or no spreading code at all.

The average value of amplified noise power is obtained by multiplying the average noise factor by the noise power density estimated in the user terminal. The user terminal obtains the interference factor $\alpha_u$ and the amplified noise power $\beta_u N_0$ and reports them to the central station through the uplink based on a report period. The report period can be several frames or scores of frames. If the report period is more than one frame, the values average out over the report period are reported.

The central station allocates radio resources such as transmission slots, spreading codes, transmission methods and transmission power in order to transmit packets to each user terminal by using the interference factor and the amplified noise power that are reported from the user terminal.

The allocation of radio resources are carried out every transmission frame. When it is assumed that the size of a packet to be transmitted to a user terminal u is $X_{req}$ bits and the $\alpha_u$ and $\beta_u N_0$ values are reported as the channel condition report, the central station allocates radio resources as follows.

Figure 4:
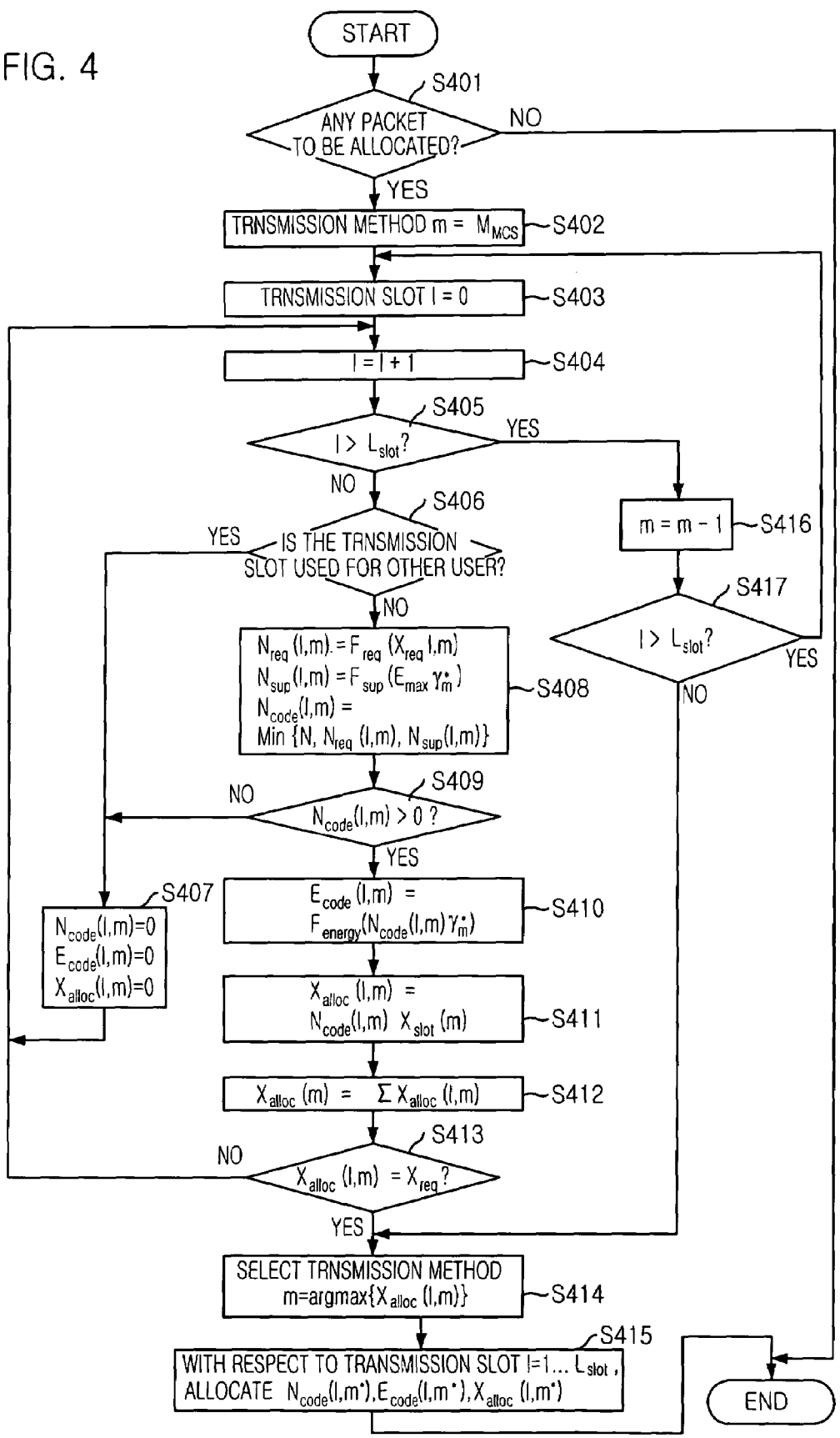
FIG. 4 is a flowchart describing radio resource allocation in the adaptive downlink packet transmission process in accordance with an embodiment of the present invention.

FIG. 4 is a flowchart describing radio resource allocation in the adaptive downlink packet transmission process in accordance with an embodiment of the present invention.

First, at step S401, it is checked whether there is a packet to which radio resources are allocated. Then, steps S402 through S417 are performed with respect to each transmission method m=$M_{MCS}$, . . . , 1.

Subsequently, the steps S403 through S417 are performed with respect to each transmission slot l=1, . . . , $l_{slot}$.

At step S406, if slot l has been already allocated to another packet, the number of spreading codes, symbol energy of the spreading code, and the number of the allocated bits in this slot are set as Equation 23 below and the step S404 is carried out from the next transmission slot l+1.

$N_{code}(l,m)=0$ $E_{code}(l,m)=0$ $X_{alloc}(l,m)=0$ \qquad Eq. 23

Subsequently, the number $N_{req}(l,m)$ of spreading codes and the maximum number $N_{sup}(l,m)$ of spreading codes that can be used are obtained based on Equations 24 and 25. At step S408, the minimum value among three values $N_{req}(l, m)$, $N_{sup}(l,m)$ and N becomes the number $N_{code}(l,m)$ of spreading codes to be allocated in the current transmission slot, which is expressed in Equation 26.

$$N_{req}(l, m) = F_{req}(X_{req}, l, m) = \text{Min}\left\{0, \frac{X_{req} - \sum_{i=1}^{l} X_{alloc}(l, m)}{X_{slot}(m)}\right\} \qquad \text{Eq. 24}$$

$$N_{sup}(l, m) = F_{sup}(E_{max}, \gamma_m^*) = \left\lfloor\left(\frac{1+\alpha_u \gamma_m^*}{\gamma_m^*}\right)\left(\frac{E_{max}}{\alpha_u E_{max} + \beta_u N_0}\right)\right\rfloor \qquad \text{Eq. 25}$$

$$N_{code}(l,m)=\text{Min}\{N, N_{req}(l,m), N_{sup}(l,m)\} \qquad \text{Eq. 26}$$

Subsequently, at step S409, it is checked whether the condition $N_{code}(l,m)>0$ is satisfied in the transmission slot 1. At step S410, symbol energy $E_{code}(l,m)$ is calculated based on Equation 27 and, at step S411, the number of allocated bits $X_{alloc}(l,m)$ is calculated based on Equation 28.

$$E_{code}(l, m) = F_{energy}(N_{code}(l, m), \gamma_m^*) = \frac{\beta_u N_0}{1/\gamma_m^* - \alpha_u(N_{code}(l, m) - 1)} \qquad \text{Eq. 27}$$

$$X_{alloc}(l,m)=N_{code}(l,m)X_{slot}(m) \qquad \text{Eq. 28}$$

At step S412, the total number of bits allocated to the transmission slots so far is calculated based on Equation 29.

$$X_{alloc}(m) = \sum_{l=1}^{L_{slot}} X_{alloc}(l, m) \qquad \text{Eq. 29}$$

At step S413, it is checked whether $X_{alloc}(m)=X_{req}$ and subsequent steps are performed.

At step S414, a transmission method m* that can be allocated with the maximum bit number with respect to the transmission method m=$M_{MCS}$, . . . , 1 is selected based on Equation 30 below.

$$m^* = \underset{m=1,\wedge M_{MCS}}{\text{argmax}} \{X_{alloc}(m)\} \qquad \text{Eq. 30}$$

With respect to the selected transmission method m*, at step S415, the number $N_{code}(l,m^*)$ of spreading codes allocated to each transmission slot, the symbol energy $E_{code}(l,m^*)$ and the number of bits $X_{alloc}(l,m^*)$ are obtained and allocated.

In accordance with the adaptive downlink packet transmission method of the present invention, the number of bits that can be allocated for each transmission method is calculated in the steps S401 through 413. At the step S414, a transmission method that can perform transmission at the highest transmission rate, that is, a transmission method that can carry the largest number of bits, is selected among the possible transmission methods. Then, at the step S415, allocation is carried out using the selected transmission method.

Also, during the processes of S401 through S413 where the number of bits that can be allocated for each transmission method is calculated, the transmission slots, spreading codes, and transmission power, which have been already selected and calculated with respect to the determined transmission method, are allocated.

The above radio resource allocating process is repeated until there is no user packet to which the radio resources are allocated, or until there is no available transmission slot.

In the radio resource allocation described above, the user terminal calculates the average values of interference factor and amplified noise power, and reports them to the central station to inform its channel conditions. The calculation in the user terminal and the report signal on the uplink may increase the complexity of the user terminal and raise overhead and interference in the uplink. Therefore, for simplifying the estimation and reporting of channel conditions, the present invention presents another adaptive packet transmission method and another adaptive radio resource allocating method.

According to the simplified adaptive transmission method, the user terminal measures and reports only the average received SINR of a pilot channel, instead of measuring and reporting the average values of interference factor and amplified noise power.

The process of allocating radio resources in the central station is the same as the method described before, except the step of allocating symbol energy for each spreading code.

When the SINR of a pilot channel reported from the user terminal u is $\gamma_{pilot,u}$, the symbol energy of Equation 27 is modified as Equation 31.

$$E_{code}(l,m) = F_{energy}(N_{code}(l,m); \gamma_m^*) = E_{pilot} \gamma_m^* / \gamma_{pilot,u}$$

wherein $E_{pilot}$ denotes pilot symbol energy transmitted through a pilot channel.

The allocation of symbol energy does not consider the interference between different spreading codes when the transmission packets in the same transmission slot are transmitted by using a plurality of spreading codes. Therefore, if the frequency selectivity is high, packet transmission error can be raised due to the increasing interference between the spreading codes. However, this method can simplify the channel condition estimating process and reduce signaling overhead in the report through the uplink.

The methods of the present invention can be embodied as programs and saved in a computer-readable recording medium such as CD-ROM, RAM, ROM, floppy disks, hard disks, magneto-optical disks and the like.

The technology of the present invention can provide a packet transmission service adaptively to the varying conditions of a user channel in a MC-CDMA system such as a satellite/mobile communication system adopting the MC-CDMA method. It transmits packets adaptively to the average moderate change of a channel over the entire band in use, instead of transmitting packets adaptively to the frequency selective fading, and it estimates the signal receiving method of the user terminal and the conditions of an actual data channel.

While the present invention has been described with respect to certain preferred embodiments, it will be apparent to those skilled in the art that various changes and modifications may be made without departing from the scope of the invention as defined in the following claims.

What is claimed is:

1. A method for transmitting packets adaptively through a downlink in a multicarrier Code Division Multiple Access (MC-CDMA) system, comprising the steps of:

a) estimating a signal-to-interference-and-noise ratio (SINR) in a user terminal after channel equalization and despreading by measuring a downlink pilot channel;

b) measuring an average interference factor and an average noise power which includes interference power of adjacent cells and background noise power and reports the average interference factor and the average noise power to a central station through an uplink; and c) allocating radio resources adaptively in the central station by determining transmission slots in a transmission frame, the number of spreading codes to be used in each transmission slot, symbol energy for each spreading code, and a transmission method which is a combination of various modulation and coding methods, based on the average interference factor and the average noise power, until transmission slots and packet to be allocated are not available, step c) further includes the steps of:

c1) calculating the number of bits that can be allocated in each transmission method;

c2) selecting a transmission method to support the highest transmission bit rate among the transmission methods; and c3) allocating radio resources by using the selected transmission method.

2. The method as recited in claim 1, wherein, in the downlink of the step a), signal transmitted from a shared channel is divided into transmission frames having a predetermined length; the transmission frames are time-divided into a plurality of transmission symbol groups in a time domain, and frequency-divided into a plurality of subcarrier groups in a frequency domain; each transmission slot is a time/frequency slot formed of a time slot corresponding to a specific symbol group and a frequency band corresponding to a specific subcarrier group; and the packets are transmitted in the transmission slot by using a predetermined orthogonal spreading code.

3. The method as recited in claim 1, wherein the user terminal measures the received symbol STNR after channel equalization and despreading, the average interference factor, the average noise factor, the average noise power based on equations expressed as:

$$Y_{u,k} = \frac{E_{k,i}}{\alpha_u \sum_{\substack{j=1 \\ j \neq i}}^{N} E_{k,j} + \beta_u N_0},$$

which expresses the received symbol SINR;

$$\alpha_u = \frac{1}{KN} \sum_{k=1}^{K} \sum_{i=1}^{N} \alpha_{u,k,i},$$

which expresses the average interference factor;

$$\alpha_{u,k,i} = \sum_{j=1}^{N} E_{k,j}, \alpha_{u,k,i,j} \bigg/ \sum_{j=1}^{N} E_{k,j};$$

-continued $$\alpha_{u,k,i,j} = \frac{\left(\sum_{n=1}^{N} C_{j,n} C_{i,n} H_{u,k,n} W_{u,k,n}\right)^2}{\left(\sum_{n=1}^{N} H_{u,k,n} W_{u,k,n}\right)^2};$$

$$\beta_u = \frac{1}{K}\sum_{k=1}^{K}\beta_{u,k},$$

which expresses the average noise factor;

$$\beta_{u,k} = \frac{\sum_{n=1}^{N}|W_{u,k,n}|^2}{\left(\sum_{n=1}^{N} H_{u,k,n} W_{u,k,n}\right)^2}; \text{ and}$$

$\beta_u N_0$, which expresses the average noise power.

4. The method as recited in claim 1, wherein the step c1) includes the steps of:

c1-1) obtaining the number $N_{req}(l,m)$ of spreading codes which is required by a transmission slot and the maximum number $N_{sup}(l,m)$ of usable spreading codes based on equations expressed as:

$$N_{req}(l,m) = F_{req}(X_{req}, l, m) = \text{Min}\left\{0, \frac{X_{req} - \sum_{i=1}^{l} X_{alloc}(l,m)}{X_{slot}(m)}\right\};$$

$$N_{sup}(l,m) = F_{sup}(E_{max}, Y_m^*) = \left\lfloor\left(\frac{1+\alpha_u Y_m^*}{Y_m^*}\right)\left(\frac{E_{max}}{\alpha_u E_{max} + \beta_u N_0}\right)\right\rfloor; \text{ and}$$

$N_{code}(l,m) = \text{Min}\{N, N_{req}(l,m), N_{sup}(l,m)\}$, and determining the least value among the number $N_{req}(l,m)$ of spreading codes, the maximum number $N_{sup}(l,m)$ of usable spreading codes, and the total number $N$ of spreading codes as the number $N_{code}(l,m)$ of spreading codes to be allocated in the current transmission slot;

c1-2) checking if the number $N_{code}(l,m)$ of spreading codes to be allocated in the current transmission slot is larger than zero $N_{code}(l,m)<0$ in the transmission slot, and calculating symbol energy $E_{code}(l,m)$ and the number $X_{alloc}(l,m)$ of allocated bits based on equations expressed as:

$$E_{code}(l,m) = F_{energy}(N_{code}(l,m), Y_m^*) = \frac{\beta_u N_0}{1/Y_m^* - \alpha_u(N_{code}(l,m)-1)}$$

and $X_{alloc}(l,m) = N_{code}(l,m) X_{slot}(m);$ c1-3) calculating the total number $X_{alloc}(m)$ of allocated bits in the transmission slots so far based on equation expressed as:

$$X_{alloc}(m) = \sum_{l=1}^{L_{slot}} X_{alloc}(l,m);$$

c1-4) checking if the total number of bits allocated in the transmission slot is the same as the size $X_{alloc}(m)=X_{req}$ of a packet to be transmitted to the user terminal.

5. The method as recited in claim 1, wherein a transmission method m* that can be allocated with the largest number of bits in the transmission method is selected in the step c2) based on equation expressed as:

$$m^* = \arg\max_{m=1,\wedge M_{MCS}}\{X_{alloc}(m)\}.$$

6. The method as recited in claim 1, wherein, in the step c3), the number $N_{code}(l,m^*)$ of spreading codes, symbol energy $E_{code}(l,m^*)$ and the number $X_{alloc}(l,m^*)$ of bits that are allocated to each transmission slot are calculated and allocated according to the selected transmission method m*.

7. The method as recited in claim 1, wherein in the step b), an average value of received symbol SINR after channel equalization and despreading is estimated and reported from the user terminal through the downlink pilot channel, and the average value of receiving symbol SINR is used in the central station to allocate a symbol energy.

8. The method as recited in claim 4, wherein, in the step c1-2), it is checked whether the number of spreading codes to be allocated to the current slot is larger than zero in the transmission slot ($N_{code}(l,m) \geq 0$); and the symbol energy $X_{alloc}(l,m^*)$ and the number $X_{alloc}(l,m)$ of allocated bits are computed based on equations 9 and 10 expressed as:

$E_{code}(l,m) = E_{pilot} Y_m^* / Y_{pilot,u}$ and $X_{alloc}(l,m) = N_{code}(l,m) X_{slot}(m).$

* * * * *